3,679,601
DEHYDROGENATION CATALYSTS
George J. Nolan and Vernon C. F. Holm, Bartlesville, Okla., assignors to Phillips Petroleum Company
No Drawing. Original application Jan. 8, 1968, Ser. No. 696,146, now Patent No. 3,580,969. Divided and this application Dec. 4, 1970, Ser. No. 95,321
Int. Cl. B01j 11/82
U.S. Cl. 252—437                                          6 Claims

ABSTRACT OF THE DISCLOSURE

Improvements in hydrocarbon dehydrogenation are realized by the use of a catalyst comprising tin and/or a tin compound supported on an aluminum phosphate.

---

This is a divisional application of our copending application having Ser. No. 696,146, filed Jan. 8, 1968, now Pat. No. 3,580,969.

The dehydrogenation of hydrocarbons to produce intermediates for numerous subsequent processes continues to be an important aspect of hydrocarbon refining and manufacture. This invention relates to such dehydrogenation processes and provides an improved process and catalyst for the dehydrogenation of hydrocarbons. The process and catalysts of this invention have particular application to the more recently developed oxidative dehydrogenation processes.

In the search for more efficient dehydrogenation processes, oxidative dehydrogenation has been extensively investigated because in theory it permits more extensive dehydrogenation at lower operating temperatures and by reaction of the oxygen with the hydrogen removed from the olefin to form water, furnishes at least part of the heat required for dehydrogenation reaction. However, oxygen present in such processes tends to react with the olefin being dehydrogenated with a consequent lowering of dehydrogenation efficiency. In addition, cracking presents a serious problem in oxidative dehydrogenation processes with a lowering of the dehydrogenation efficiency.

Several species of hydrocarbons are of particular interest herein due to the significance of the dehydrogenation in the preparation of these hydrocarbons. Such compounds are for example, conjugated diolefins such as 1,3-butadiene and isoprene which are widely used in the manufacture of synthetic rubber. These diolefins are usually made by dehydrogenation of the corresponding monoolefins, that is, the butenes and the isopentenes. Since these olefin feed stocks are relatively expensive, and since the synthetic rubber business is highly competitive, a search is constantly being made for ways to increase the efficiency of the olefin dehydrogenation step, thereby improving the overall efficiency of the synthetic rubber manufacture. Examples of other materials that can be dehydrogenated with the catalysts of the invention are the normal pentenes, hexenes, octenes, decenes, unsubstituted and alkyl-substituted cycloalkenes such as cyclopentene, cyclohexene, 3-butylcyclohexene, 3-isopentylcyclopentene, and the like.

Aluminum phosphate catalyst systems have been known in the prior art. However, they generally have been used in cracking processes as aluminum phosphate is a good cracking catalyst. In addition, they have been known to be useful in isomerization reactions. Particular species of aluminum phosphate catalyst also have been employed in the dehydrogenation of hydrocarbons as disclosed by our U.S. Pat. 3,304,342. As discussed in the specification of our patent, we discovered that aluminum phosphate catalysts possess a high degree of selectivity for the dehydrogenation of alkenes in an oxidative dehydrogenation system as opposed to the teachings of the prior art that catalysts comprising aluminum phosphate are highly active cracking catalysts and would, therefore, be expected to show higher selectivity toward cracking then toward dehydrogenation.

As pointed out in our patent U.S. 3,304,342, highly-selective oxidative dehydrogenation of butene to butadiene is obtained with an aluminum phosphate catalyst, in the absence of steam. The use of steam is highly desirable in oxidative dehydrogenation because it is an excellent heat carrier and thus permits better control of the exothermic oxidative dehydrogenation reaction, and also because it reduces coke formation. We found that when steam was used with the catalysts of our aforementioned patent, conversion was drastically reduced. We have now found that reasonably high conversion and very high selectivity can be obtained by adding tin or compounds thereof, such as the oxides and phosphates to the aluminum phosphate. The tin or tin compound preferably comprises about 5 to about 50 weight percent tin based on the combination of the tin and/or tin compound and the aluminum phosphate.

The operating conditions employed in the dehydrogenation process of this invention can vary widely but will generally include a temperature from about 800 to about 1300° F., preferably from about 900 to about 1200° F., a pressure from about 0.05 to about 50 p.s.i.a., preferably from about 0.1 to about 25 p.s.i.a. and an oxygen to gaseous hydrocarbon volume ratio from about 0.1:1 to about 3:1, preferably from about 0.5:1 to about 2:1. The hydrocarbon space rate (volumes of hydrocarbon vapor per volume of catalyst per hour, 32° F., 15 p.s.i.a.) can be from about 50 to about 5000, preferably from about 100 to about 2500. It is presently preferred that the concentration of steam, when used, be within the range of 0.1 to about 50 mols of steam per mol of hydrocarbon, e.g., olefin, in the feed.

The oxygen can be employed as such or with an inert diluent such as nitrogen and the like. Desirable oxygen-containing gases include air, flue gases containing residual oxygen, and the like. The presence of oxygen during the dehydrogenation reaction permits the use of long operating periods. However, when catalyst regeneration is required, it can be effected simply by terminating olefin flow for a short period and continuing the flow of oxygen-containing gas at the same or higher rate. Dehydrogenation is resumed simply by starting olefin flow once again.

The process of this invention is ordinarily carried out by forming a mixture, preferably preheated, of the hydrocarbon, optionally steam, and oxygen or oxygen-containing stream and passing this mixture over the catalyst at the desired temperature, pressure, and flow rate. Recycle of unconverted hydrocarbon can be employed if desired; however, the conversion rate and selectivity of this invention are generally sufficiently high to justify a single step, i.e., single pass operation, if for example, the product streams can be used without separation steps in a subsequent operation such as a polymerization, isomerization, or the like.

The catalysts of this invention can be prepared by mixing aluminum phosphate or a compound convertible to aluminum phosphate on calcination with tin or a tin compound, and heating the resulting mixture in an oxidizing atmosphere at a temperature of 1000° to 1500° F. for 1 to 10 hours. Other well known methods of preparation, such as coprecipitation, dry or wet mixing, such as in a ball mill, impregnation, and the like, can be used. Aluminum phosphate can be prepared by the reaction of soluble aluminum salts and phosphoric acid. Any known tin compound, inorganic or organic, can be used.

The preparation and compositions of the catalyst of this invention are illustrated by the following examples.

EXAMPLE I

A mixture of 50 grams of alumina and 135 grams of diammonium hydrogen phosphate was calcined for 4 hours at 1200° F. A portion of this catalyst was mixed with an aqueous solution of stannous sulfate sufficient to give 27 weight percent tin in the finished catalyst, dried 2 hours at 392° F., and calcined for 3 hours at 1100° F.

EXAMPLE II

A paste of 50 grams of alumina and 120 grams of 85 weight percent phosphoric acid was dried overnight at 525° F. and calcined for 46 hours at 1200° F. A portion of this catalyst was mixed with an aqueous solution of stannous sulfate sufficient to give 26 weight percent tin in the finished catalyst, dried 2 hours at 392° F., and calcined 3 hours at 1100° F.

EXAMPLE III

A mixture of 100 grams of alumina and 340 ml. of 85 weight percent phosphoric acid was refluxed for 4 hours, 28 grams of additional alumina was added, refluxing was continued for 5 hours, the mixture was cooled, diluted to 1500 ml. with deionized water, filtered, washed twice with 1500-ml. portions of deionized water, and dried at 212° F. A portion of this catalyst was mixed with an aqueous solution of stannous sulfate sufficient to give 20 weight percent tin in the finished catalyst, dried 2 hours at 392° F. and claimed calcined for 3 hours at 1100° F.

EXAMPLE IV

A catalyst was prepared by prior art methods to provide a comparison between those catalysts and the catalysts of this invention. Five grams of eta-alumina (<60 mesh) was dispersed in 1.39 grams of dibasic ammonium phosphate dissolved in 20 ml. of deionized water. To this stirred mixture was added 3.56 grams of $SnCl_2 \cdot 2H_2O$ dissolved in 20 ml. of deionized water and acidified with 3 drops of concentrated hydrochloric acid. The precipitate was filtered off and dried for 4 hours at 1022° F. in a stream of dry air to give a catalyst containing 24 weight percent tin.

The catalysts of Examples II, III and IV as well as the precursor "aluminum phosphate" of Example III were analyzed by X-ray diffraction to determine their composition; these results are presented in the following table.

| Catalyst | Cassiterite (SnO₂) | Aluminum phosphate Form B | Aluminum phosphate Berlinite | Eta-Al₂O₃ | Tin pyrophosphate SnP₂O₇ |
|---|---|---|---|---|---|
| Example IV | X | | | X | X |
| Example III | X | | X | | |
| Example II | X | X | X | | |
| Example III [1] | | X | X | | |

[1] Aluminum phosphate intermediate of Example III.

It is evident from these results that the phosphate ion of the prior art procedure and catalyst reacted exclusively with the tin ion and as a result did not react with the alumina to convert the same to aluminum phosphate. As a result, the catalyst of Example IV consisted of tin oxide, alumina and tin pyrophosphate. It is further evident that the intermediate of Example III; i.e., the reaction product of alumina with at least a stoichiometric amount of phosphoric acid results in the conversion of the alumina to the indicated forms of aluminum phosphate indicated in the table. The phosphate ion bonded to the aluminum was not attacked by the tin compounds present during the mixing, drying and calcination steps of Examples II and III as evidenced by the lack of any tin phosphates in those catalysts. In addition, it is evident that the aluminum phosphate of the catalysts of Examples II and III was not converted to alumina, although those catalysts were calcined for extended periods at elevated temperatures. As a result, the catalysts of this invention contain substantially no alumina when prepared by the presently preferred method involving the reaction of a stoichiometric amount of phosphate ion with the alumina as illustrated by the examples.

EXAMPLE V

The catalysts of Examples I through III were utilized in the form of 20/28 mesh (Tyler) granules in the dehydrogenation of butene-2 to butadiene in the presence of added air and steam at a temperature of 1000° F. and atmospheric pressure. Gaseous hourly space velocities (32° F., 14.7 p.s.i.a.) of the butene-2, air, and steam were 200, 1000 and 2400 volumes per volume of catalyst per hour, respectively. Conversions and selectivities were determined at 1, 3 and 6 hours subsequent to the initiation of reaction.

| | At 1 hour | | At 3 hours | | At 6 hours | |
|---|---|---|---|---|---|---|
| | Butene conversion | Selectivity to butadiene | Butene conversion | Selectivity to butadiene | Butene conversion | Selectivity to butadiene |
| Catalyst No.: | | | | | | |
| 1 [1] | 0.9 | 62 | 1.1 | 67 | | |
| 1 | 15 | 99 | 17 | 99 | 19 | 98 |
| 2 [1] | 1.6 | 83 | | | | |
| 2 | 13 | 99 | 17 | 99 | 17 | 99 |
| 3 [1] | 1.6 | 87 | 1.7 | 87 | | |
| 3 | 12 | 99 | 17 | 100 | 22 | 99 |

[1] Aluminum phosphate intermediate before addition of tin compound.

It is evident from this comparison that the catalyst of this invention provided highly superior conversions and selectivity to the diolefin throughout the test and far outlasted the prior art catalysts. Selectivities for the catalysts of this invention were consistently very high throughout the entire period of operation and conversions over each catalyst usually increased with time. On the contrary, conversions over the prior art catalyst were initially very low by comparison and the catalysts were completely inactive after less than 6 hours on stream.

We claim:

1. A hydrocarbon dehydrogenation catalyst consisting essentially of an aluminum phosphate support and from about 5 to about 50 weight percent of a tin component which is tin, tin oxide or tin phosphate, based on the total weight of said catalyst.

2. The catalyst of claim 1 wherein said tin component is at least one of tin oxides and tin phosphates.

3. The catalyst of claim 2 wherein said tin component is tin oxide.

4. A method of preparing the catalyst of claim 1 which comprises reacting alumina with at least a stoichiometric amount of phosphate ion to convert said alumina to at least one phosphate of aluminum, impregnating the thus formed aluminum phosphate with at least one of tin and compounds of tin oxidizable to tin oxide, and oxidizing the mixture thus formed to produce said catalyst.

5. The method of claim 4 wherein said phosphate ion is provided in the form of diammonium hydrogen phosphate and said tin compound is selected from stannous and stannic sulfates.

6. The method of claim 4 wherein said oxidation is effected by calcining said mixture in an oxidizing atmosphere at a temperature and for a duration sufficient to oxidize said tin compound.

(References on following page)

References Cited

UNITED STATES PATENTS

| | | | |
|---|---|---|---|
| 3,207,805 | 9/1965 | Gay | 260—680 R |
| 3,274,283 | 9/1966 | Bethell | 252—437 X |
| 3,320,329 | 5/1967 | Nolan | 252—437 X |
| 3,320,331 | 5/1967 | Gaspar et al. | 252—437 X |
| 3,359,325 | 12/1967 | Sennewald et al. | 252—437 X |

PATRICK P. GARVIN, Primary Examiner

U.S. Cl. X.R.

260—680 E